United States Patent [19]

Lowi, Jr.

[11] 4,164,850
[45] Aug. 21, 1979

[54] COMBINED ENGINE COOLING SYSTEM AND WASTE-HEAT DRIVEN AUTOMOTIVE AIR CONDITIONING SYSTEM

[76] Inventor: Alvin Lowi, Jr., 2146 Toscanini Dr., San Pedro, Calif. 90732

[21] Appl. No.: 631,023

[22] Filed: Nov. 12, 1975

[51] Int. Cl.² .................... F25B 27/02; F25B 14/04
[52] U.S. Cl. .................... 62/196 C; 62/238; 62/500; 165/62
[58] Field of Search ............ 62/238, 324, 500, 244, 62/323, 196 C; 165/62

[56] References Cited

U.S. PATENT DOCUMENTS

| | | | |
|---|---|---|---|
| 2,327,451 | 8/1943 | Perrine | 62/238 X |
| 2,353,966 | 7/1944 | Newcombe | 62/238 X |
| 2,360,969 | 10/1944 | Newcombe | 62/238 X |
| 2,404,778 | 7/1946 | Allison | 62/238 X |
| 2,783,622 | 3/1957 | Bourassa | 165/62 X |
| 2,801,827 | 8/1957 | Dolza | 165/62 X |
| 3,153,441 | 10/1964 | Pippert et al. | 62/238 X |
| 3,500,897 | 3/1970 | Von Cube | 62/238 X |
| 3,817,043 | 6/1974 | Zoleta | 62/238 X |
| 3,922,877 | 12/1975 | Ophir | 62/238 |

Primary Examiner—Irwin C. Cohen
Attorney, Agent, or Firm—Nilsson, Robbins, Dalgarn, Berliner, Carson & Wurst

[57] ABSTRACT

An improved engine cooling system is combined with an automotive air conditioning system for utilizing otherwise waste heat from an engine to vaporize refrigerant fluid which is condensed and pumped back to the engine in a closed cycle. In a cooling mode, vaporized refrigerant is conveyed via a jet ejector to the automobile radiator, a condensed portion of the refrigerant fluid being drawn by the ejector through a throttling valve and a conditioner air coil to provide evaporative cooling. In a heating mode, the vaporized refrigerant is conveyed directly to the conditioner air coil, which then serves as a condenser to provide condensation heating. The partially condensed refrigerant is further condensed at the radiator and then pumped back to the engine.

14 Claims, 5 Drawing Figures

COMBINED ENGINE COOLING SYSTEM AND WASTE-HEAT DRIVEN AUTOMOTIVE AIR CONDITIONING SYSTEM

FIELD OF THE INVENTION

The fields of art to which the invention pertains include the fields of automotive engines, air conditioning, refrigeration and heating.

BACKGROUND AND SUMMARY OF THE INVENTION

Private automobiles represent one of the largest single classes of energy consumers in the United States. A significant portion of fuel consumption of automobiles is due to the growing use of air conditioners. Additionally, air conditioning equipment constitutes a significant fraction of the initial cost of the private automobile. Such equipment typically is provided with a reciprocating piston compressor which is mechanically coupled to the engine and is generally complete in itself as an add-on component.

On the other hand, waste heat from automobile engines is available virtually free of cost and is responsive to relatively high energy level uses. Within minutes, even at idle, tail pipe temperatures exceed 500° F. Fully 40% of the heating value of total fuel consumption of a spark ignition engine exits at the tail pipe. Another 35 to 40% leaves by the cooling system. At cruising conditions, gas temperatures exceeding 1200° F. are produced. Such high temperature conditions result in the formation of environmentally burdensome amounts of oxides of nitrogen.

Accordingly, it would be desirable to provide some means of high rate utilization of the exhaust heat to take economic advantage thereof and to reduce the rate of formation and concentration of emissions of oxides of nitrogen. The present invention provides a means for effectively and economically controlling engine temperatures while utilizing the otherwise wasted heat generated by an automotive engine, thereby reducing the overall temperature of the system. In particular, the present invention combines an improved automotive engine cooling system with an air conditioning system which utilizes waste heat from the engine to vaporize refrigerant fluid which travels through a condenser and is pumped back to the engine. While the present system uses a smaller than conventional coolant pump which may be either driven by the fan belt or electrically driven, there are no additional high-speed rotary or reciprocating compressor parts such as bearings, belts, dynamic seals, lubricants, clutches, or other mechanical features as presently required for air conditioning. Accordingly, wear and leakage are eliminated as factors limiting the service life of the equipment. Furthermore, as the engine coolant is caused to undergo a liquid-to-vapor phase change in the cooling jackets, high heat transfer rates to the virtually constant temperature organic, inert, dielectric fluid will result in greater uniformity of temperature of engine parts, thereby reducing thermal distortions, corrosion, hot spots, lubricant break-down and, consequently, engine wear. The high-rate heat transfer characteristic should be particularly valuable in high performance and rotary (Wankel) engines, especially when aluminum construction is used.

Specifically, in a cooling mode, vaporized refrigerant fluid is conveyed via a jet ejector through a condenser/radiator while a portion of the fluid is diverted from the condenser to a conditioner/fan-coil which serves as a refrigerant evaporator. The diverted portion is evaporated at the conditioner to produce a refrigeration effect and is then returned to the condenser by aspiration via the jet ejector. A high degree of efficiency can be accomplished by heat exchange through crossing vapor and liquid lines and by the use of thermostatic controls, as will be described.

In a heating mode, the vaporized refrigerant fluid is conveyed in a reverse direction directly through the conditioner and then to the condenser. In this mode, the conditioner serves as a condenser to provide a heating effect.

Cooling or heating is selected by appropriate valving. When both modes are closed out of the circuit, the pump circulates the refrigerant in a closed loop between the engine and condenser/radiator via a pressure relief by-pass valve which limits the maximum refrigerant, and thus engine jacket, temperature, to the saturation value corresponding to the pressure relief setting. Additionally, a normally open thermostatically controlled valve permits by-pass of the engine to acclerate warm-up on starting. When neither heating nor cooling modes dissipates sufficient heat to maintain proper engine jacket temperatures, the excess refrigerant vapor is automatically by-passed directly to the condenser/radiator which has sufficient capacity to reject all engine jacket waste heat to ambient air.

DETAILED DESCRIPTION

Figure 1:
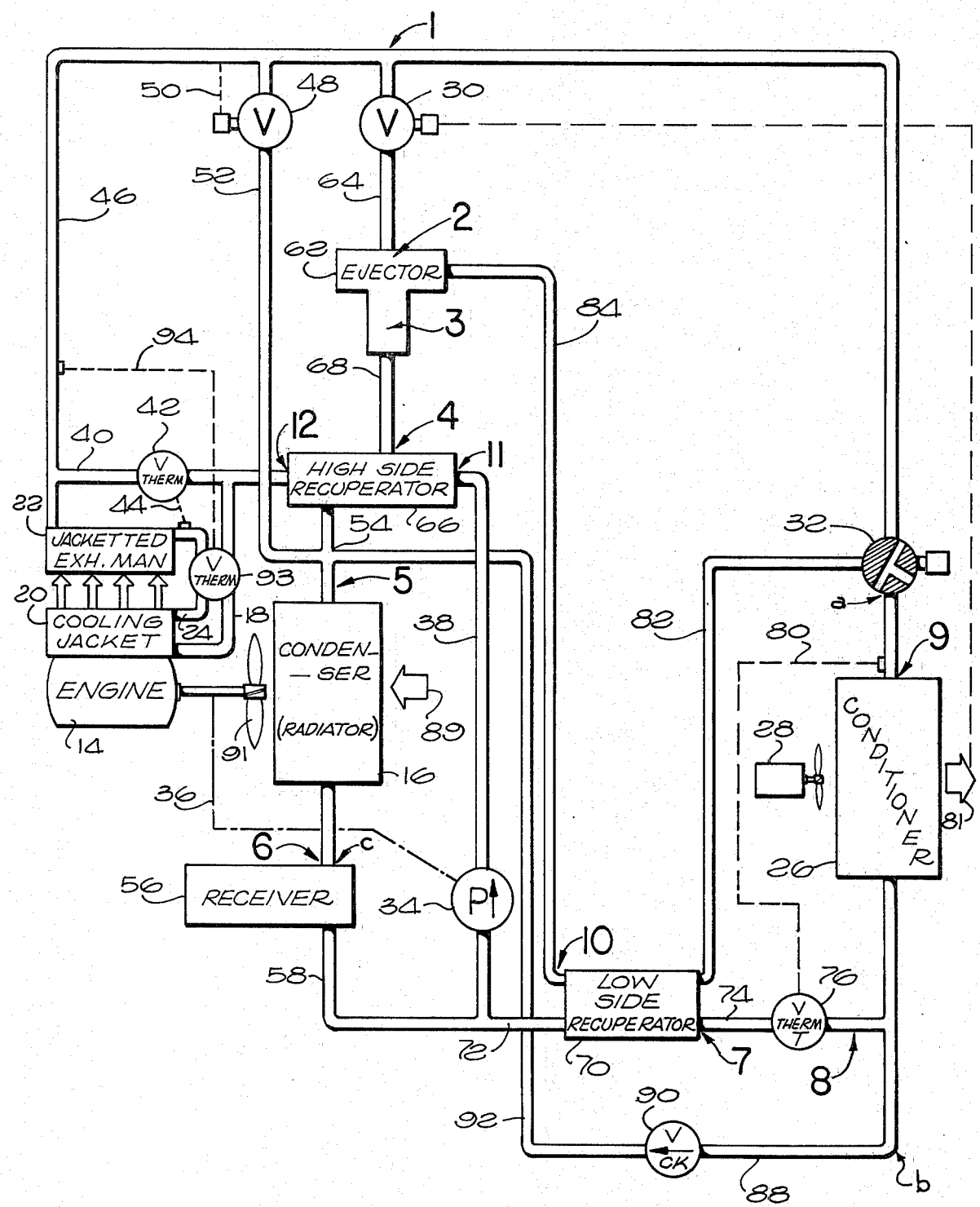
FIG. 1 is a schematic illustration of an air conditioning system constructed in accordance with the present invention.

Referring to FIG. 1, the present system incorporates the engine cooling system of an automobile, whereby the engine 14 and condenser/radiator 16 of an automobile respectively vaporize and condense refrigerant fluid carried in a closed circuit. The head and block cooling jacket 20 of the engine 14 consists of cores forming conduits therethrough in the conventional manner and tubing 18 is connected to the cooling jacket inlet to supply refrigerant fluid thereto. The engine's exhaust manifold 22 is jacketed, as is commonly done with marine engines. The exhaust manifold jacket casting is also cored to provide conduits for conveyance of refrigerant fluid which is supplied from the head and block cooling jacket 20 by tubing 24.

Engine Cooling Circulation Mode

The present system includes a circulation mode wherein engine waste heat is dumped to ambient via the condenser 16. In the circulation mode, the system neither cools nor heats the conditioned air, or such demands for waste heat are insufficient to remove engine waste heat at the rate required for proper engine temperature control. Flows of refrigerant fluid in the circulation, cooling and heating modes are shown schematically in FIGS. 3, 4 and 5, respectively, and the schematic figures will be referred to in conjunction with FIG. 1 in describing each of the systems. Additionally, the thermodynamic diagram of FIG. 2 will be referred to in describing the cooling and heating modes.

Figures 3, 4, 5:
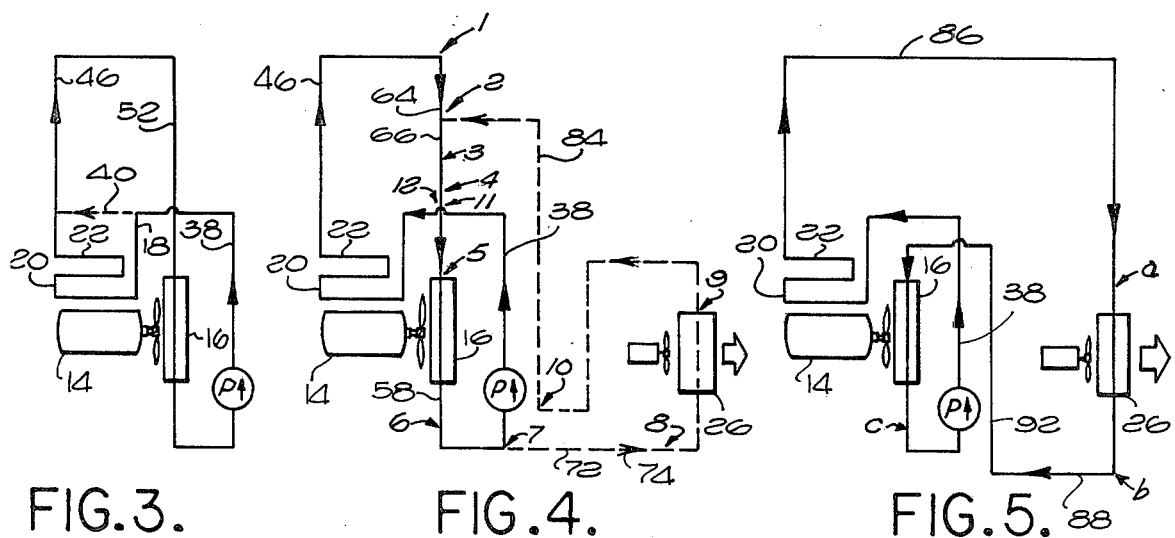
FIG. 3 is a diagrammatic representation of the flow of refrigerant fluid when both cooling and heating modes are closed out of the circuit and only engine cooling is required.
FIG. 4 is a diagrammatic representation of the flow of refrigerant fluid during an air conditioning cooling mode.
FIG. 5 is a diagrammatic representation of the flow of refrigerant fluid during an air conditioning heating mode.

Referring to FIGS. 1 and 3, in a circulation mode of operation, solenoid valves 30 and 32 are closed so that only the left side of the system, as depicted in FIG. 1, is operative. Initially, with a cool engine, refrigerant fluid driven by a pump 34 is conveyed through tubing 38 (via a recuperator functional in the cooling mode to be described) and bypass tubing 40 through a normally open thermostatic valve 42. Bypass through the thermostatic valve 42 limits engine cooling so as to accelerate engine warm-up. The thermostatic valve 42 senses the engine temperature, as indicated by the dashed line 44, and closes after engine warm-up so that the refrigerant fluid then passes through the engine cooling jacket 20 and jacketed exhaust manifold 22 via the tubing 18 and 24 thereto.

The refrigerant fluid is vaporized by the engine cooling jacket 20 and jacketed exhaust manifold 22 and, as vapor, travels through tubing 46 to a pressure by-pass valve 48. The pressure by-pass valve 48 is responsive, as indicated at 50, to pressure in the tubing 46 to open and permit refrigerant vapor to be conducted through tubing 52 to and through the condenser 16 via a four-way tubing intersection 54. As a result of closure of the valves 30 and 32, the only pathway through the intersection 54 is to and through the condenser 16. As the refrigerant fluid passes through the condenser 16, it is condensed and accumulated at a receiver 56 and then travels from there through tubing 58 to the pump 34 to repeat the cycle, while heat from engine cooling is rejected to ambient air 89, drawn through the condenser/radiator 16 by the engine driven fan 91. The refrigerant fluid vapor may be superheated in the exhaust manifold jacket 22 as indicated at point 1 in FIG. 2. Control of the degree of superheat can be obtained by a modulating thermostatic expansion valve 93 responsive to the vapor temperature, as indicated at 94, by a liquid charged capillary sensor to admit refrigerant liquid directly into the exhaust manifold jacket as required to maintain a preset increment of superheat regardless of the proportions of heat input received in the engine jacket and the exhaust manifold jacket, respectively.

A conditioner 26 is provided, including an electrically driven (by means not shown) fan 28 which blows air to be comfort conditioned across coils (not shown) constituting the conditioner 26. The conditioner 26 serves as an evaporator during a cooling mode of operation and as a condenser during a heating mode, as will be described in more detail hereinafter. By appropriate operation of solenoid valves 30 and 32, as hereinafter described, vaporized refrigerant fluid, e.g., trichlorofluoromethane (Refrigerant 11), is conveyed either from the condenser 16 to the conditioner 26, in a cooling mode, or from the engine 20 to the conditioner 26, in a heating mode. The pump 34 is either mechanically driven by the engine 20, as schematically indicated at 36, or is electrically driven, and delivers condensed refrigerant fluid from the condenser/radiator 16 to the engine 20.

Air Conditioning Cooling Mode

Figure 2:
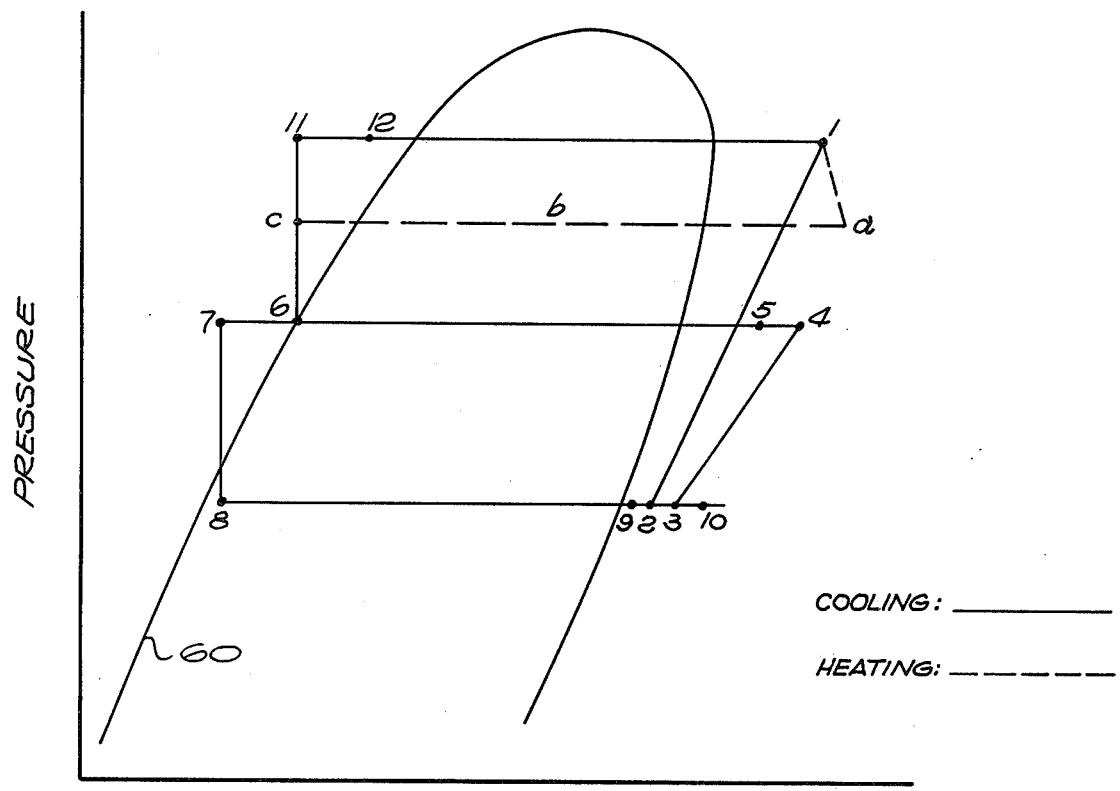
FIG. 2 is a thermodynamic diagram of the processes taking place when utilizing the present system, the cooling mode being represented by a solid line and the heating mode by a dashed line.

The cooling mode of operation can best be described by referring to FIGS. 1 and 4 together with FIG. 2. In FIG. 2, the pressure and enthalpy at various point locations of the apparatus are plotted with respect to the vapor/liquid equilibrium line 60 for the refrigerant fluid. Points to the left of the line, e.g., points 6, 7, 11 and 12 (and point c for the heating mode) represent locations in the apparatus at which the refrigerant fluid is in a liquid state. The regions within the curve, e.g., point 8 (point d for the heating mode), represent points in the apparatus at which the refrigerant fluid is a mixture of vapor and liquid. Points to the right of the curve, e.g., points 1–5, 9 and 10 (point a in the heating mode) represent points in the apparatus at which the refrigerant fluid is superheated vapor.

For operation in the cooling mode, the system includes an aspirator in the form of a jet ejector 62 connected to the valve 30 by tubing 64 and conveying refrigerant vapor to a heat exchanger or recuperator 66 through tubing 68. Jet ejectors are known; see for example the article entitled "Experimental Research on a Fluorinated Hydrocarbon Jet Refrigerant Plant" by Cavallini et al, appearing in "Progress in Refrigeration Science and Technology," Vol. 2, (1967), pages 1225–1238, incorporated herein by reference. The heat exchanger 66 is referred to in the drawing as a high (pressure) side recuperator and permits recovery, from the high (pressure) side of the system, of the residual heat of compression by transfer to the engine coolant (refrigerant) feed liquid. The refrigerant vapor is then conveyed past the intersection 54 through the condenser 16, to the receiver, and, for the most part, back to the pump 34.

A minor portion of the refrigerant liquid from the condenser 16 is diverted through the conditioner 26 by means of tubing constituting a parallel circuit across the ejector 62 and condenser 16. The parallel circuit includes a low (pressure) side recuperator 70 through which a portion of the condensed refrigerant fluid is led via tubing 72 and then via tubing 74 through a thermostatic expansion or throttle valve 76 and tubing 78 to and through the conditioner 26. The thermostatic expansion valve 76 is controlled to increase delivery in accordance with refrigerant superheat temperature increases sensed at the refrigerant exit of the conditioner 26 as indicated at 80. The conditioner 26 functions as an evaporator to vaporize the refrigerant fluid by cooling the conditioned air 81 circulated therethrough by means of the fan 28.

Tubing 82 and 84 connects the conditioner 26 via the low side recuperator 70 to the ejector 62 so that flow of the primary stream of refrigerant through the ejector 62 induces flow from the system's low pressure side to aspirate refrigerant vapor from the conditioner 26. The three-way solenoid valve 32 is in a disposition rotated 45° clockwise from that shown in FIG. 1 so as to direct the refrigerant vapor through the tubing 82. The refrigerant vapor is drawn through the low side recuperator 70, for heat exchange with and subcooling of the condensed refrigerant liquid from the receiver 56, and then through the tubing 84 into the ejector 62, to complete the circuit.

In fluid flow terms, and referring more closely to the points 1–12 on the thermodynamic diagram of FIG. 2, refrigerant vapor heated by the engine cooling jacket 20 and jacketed exhaust manifold 22 enters the ejector 62 primary nozzle via the solenoid valve 30 at 1 and is supersonically expanded to the system low pressure level at 2, inducing flow from the system low pressure side 9 to evacuate the evaporator of refrigerant via the low side recuperator 70 at 7. The two streams combine and mix in the ejector 62 at 3 and diffuse to the intermediate pressure level of the system at 4 through the high side recuperator 66. Some of the residual heat of compression from the high side is recovered by transfer to the engine feed liquid in the high side recuperator 66 at 11–12 prior to the refrigerant fluid entering the condenser 16 at 5 where the remaining superheat, latent heat and perhaps some additional sensible heat (sub-cooling) is extracted by ambient air to condense the refrigerant at 6 which is then held up in the receiver 56. The major portion of this subcooled refrigerant liquid is returned to the engine by the pump 34 at the system high pressure level 11–12 via the recuperator 66. The remainder passes through the low side recuperator 70 for further sub-cooling at 7 by heat exchange with the vapor leaving the conditioner 26 and is throttled to the conditioner 26 at the system low pressure level at 8 to make available its latent heat of evaporation at a low temperature to produce a refrigeration effect.

Air Conditioning Heating Mode

Referring now to FIG. 5, in conjunction with FIGS. 1 and 2, with respect to the heating mode of operation, the solenoid valve 30 is closed and the three-way center closed solenoid valve 32 is rotated 45° counterclockwise from the position shown in FIG. 1 so that the ejector 62 is closed out of the system. In this mode, refrigerant fluid, vaporized by the engine cooling jacket 20 and jacketed exhaust manifold 22, is conveyed through tubing 86 to and through the conditioner 26, now in a reversed direction. The conditioner 26 now serves as a condenser with the refrigerant producing a heating effect in giving up its latent heat of condensation to the air passing therethrough by force of the fan 28. The partially condensed refrigerant is then conducted through the tubing 78 but bypasses the expansion valve 76 via tubing 88 and a check valve 90. The refrigerant is ducted by tubing 92 to the tubing intersection 54 and from there is conveyed to and through the condenser 16. The refrigerant is returned to the high pressure side via the receiver 56 and pump 34 in the same manner as described above with respect to the other modes of operation.

In fluid flow terms, and referring more closely to the points a, b and c in the thermodynamic diagram of FIG. 2, superheated refrigerant vapor at point a, adjacent the three-way solenoid valve 32, is conducted through the conditioner 26 where it partially condenses, travels to point b, through the check valve 90, through the condenser to point c then via the pump 34 back to the engine.

It will be appreciated that one can simply switch from a cooling mode to a heating mode, or to neither cooling nor heating, by simple actuation of solenoids controlling the valves 30 and 32. Modulation of the cooling capacity can be effected by cycling valve 30 on demand from an air temperature thermostat (not shown). Modulation of heating capacity can be similarly effected by cycling valve 32 with valve 30 closed. When neither heating nor cooling of conditioned air is called for, both valves 30 and 32 are closed to all ports and the high side pressure (and temperature) is permitted to float upward to the pressure relief setting of the pressure bypass valve 48. Enough refrigerant is circulated directly to the condenser/radiator 16 to dump all the engine 14 waste heat to ambient via the condenser/radiator 16 and the ambient air circulated therethrough by force of the fan 91. The refrigerant pump 34 operates continuously while the engine is operating and together with the pressure bypass valve 48 serves to limit the maximum engine jacket temperature to an acceptable level.

The adiabatic efficiency of the ejector 62 and the overall coefficient of performance (COP) of the system can be calculated utilizing hypothetical cycle conditions and refrigerant (DuPont Freon 11), as listed in Table 1.

TABLE 1

| FIG. 1 Location | Temp., °F. | Pressure, psia | Enthalpy, BTU/lb. |
|---|---|---|---|
| 1 | 280 | 160 | 126 |
| 2 | 63 | 7 | 100 |
| 3 | 68 | 7 | 101 |
| 4 | 199 | 33 | 118 |
| 5 | 152 | 33 | 111 |
| 6 | 120 | 33 | 33 |
| 7 | 101 | 33 | 29 |
| 8 | 40 | 7 | 29 |
| 9 | 50 | 7 | 98 |
| 10 | 80 | 7 | 102 |
| 11 | 140 | 160 | 38 |
| 12 | 173 | 160 | 45 |

The gross thermal ratio of the ejector 62 is:

$$\eta_{ej} = \frac{\text{gross compression energy}}{\text{available motion energy}} \quad (1)$$

$$= \frac{(h_4 - h_{10})(G_1 + G_{10})}{(h_1 - h_2)G_1}$$

where subscripts (here and hereinafter) refer to locations in FIG. 1 and FIG. 2 and where h=enthalpy and G=mass flow.

From an energy balance in the ejector 62, $$G_{10}h_{10} + G_1h_1 = (G_1 + G_{10})h_4 \quad (2)$$

Assuming a unit mass of low side vapor, $G_{10}=1$, from Eq. 2:

$$G_1 = (h_4 - h_{10})/(h_1 - h_4)$$

Using properties listed in Table 1:

$$G_1 = (118 - 102)/(126 - 118) = 2;$$

then from Eq. (1)

$$\eta_{ej} = \frac{118 - 102}{126 - 100} \times \frac{3}{2} = 0.92$$

and the adiabatic efficiency of the ejector 62 is:

$$\eta_{ad} = \left( \frac{h_4 - h_{10}}{h_1 - h_2} \cdot \frac{G_v}{G_s} \right) = \frac{16}{26} \times \frac{1}{2} = 0.308.$$

The cooling effect under these conditions is $$Q_{ref} = (h_9 - h_8)G_{10}$$

$$= 69 \times 1 = 69 \text{ BTU}.$$

The net heat input of the engine to the refrigeration system would be $$Q_{in} = (h_1 - h_{12})G_1$$

$$= 81 \times 2 = 162 \text{ BTU}.$$

The overall coefficient of performance of the system would be $$COP = \frac{Q_{ref}}{Q_{in}} = \frac{69}{162} = 0.426.$$

Typical cooling capacity and a comparison with mechanical vapor compression refrigeration can be determined by assuming typical cruise characteristics of an automotive installation, as listed in Table 2.

TABLE 2

| | |
|---|---|
| Road horsepower (RHP) | 30 |
| Specific fuel consumption (SFC) lb/RHP-hr. | 0.5 |
| Speed, mph | 45 |
| Fuel consumption, mpg | 18 |
| Fuel heating value (HV) BTU/lb | 20,000 |
| Fuel density, lb/gal | 6 |
| Exhaust temperature, °F. | 1,000 |
| Cylinder overall temperature °F. | 250 |

Determining first the potential cooling capacity available from the forgoing automotive installation, the total heat input to the engine is $$Q_F = RHP \times SFC \times HV$$

$$= 30 \times 0.5 \times 20,000 = 300,000 \text{ BTU/hr}.$$

of which about half is passed out via the exhaust system.

Assuming no more than 25% of the engine waste heat is economically recovered by 173° to 280° F. refrigerant from 1000° F. exhaust gas and 250° F. cylinder walls, about 75,000 BTU/hr is added to the refrigerant in the boiler (engine cooling jackets). The net refrigeration capacity at the 40° F. evaporator (conditioner 20) is then $$Q_{ref} = COP \times Q_{in}$$

$$= 0.426 \times 75,000 = 31,950 \text{ BTU/hr}$$

$$= 2.66 \text{ tons}.$$

The net heating capacity at a 180° F. (80 psia) conditioner temperature would be 75,000 BTU/hr.

Conventional mechanical vapor compression refrigeration, which has a COP, measured from the shaft, of 3 would require a compressor shaft power input (HP$_c$) of approximately $$HP_c = \frac{Q_{ref}}{2545 \, COP} = \frac{31,950}{2545 \times 3} = 4.185 \text{ hp}.$$

This additional load on the engine results in an increase in power requirements of $$\frac{4.185}{30 + 4.185} \times 100 = 12.2\%$$

and a comparable increase in fuel consumption.

Table 3 sets forth the typical physical characteristic of the system of FIG. 1.

TABLE 3

| | |
|---|---|
| Pump pressure rise, psi | 127 |
| Pump shaft efficiency | 0.5 |
| Pump shaft horsepower (SHP) | 0.178 |
| Pump flow rate, gpm | 1.2 |
| Compressor-induced flow rate, cfm | 45.2 |
| High side recuperator effectiveness | 0.6 |
| High side recuperator number of transfer units (Counterflow) | 1.5 |
| Low side recuperator effectiveness | 0.57 |
| Low side recuperator number of transfer units (Counterflow) | 1.3 |
| Condenser/radiator capacity BTU/hr. | |
| at 120° F. refrigerant | 150,000 |
| at 250° F. refrigerant | 3,000,000 |
| Evaporator/conditioner capacity BTU/hr. | |
| at 40° F. refrigerant | 32,000 |
| at 150° F. refrigerant | 85,000 |

The additional load of the pump on the engine results in a negligible increase in power requirement of $$0.178/(30+0.178) \times 100 = 0.59\%$$

Accordingly, it will be appreciated that an effective air cooling and heating system has been provided with only negligible power increase requirements. Further, a sealed engine cooling system incorporating an evaporating halocarbon fluid has been provided which virtually eliminates scaling, corrosion and freezing while reducing weight and bulk and increasing engine performance and life by improving temperature control and uniformity. Also, the high rate cooling of engine exhaust will tend to reduce the formation and emission of NOx in the exhaust.

I claim:

1. An automotive engine cooling and air conditioning cooling and heating system for utilizing otherwise wasted heat from an engine to vaporize refrigerant fluid, comprising:

a closed fluid circuit means;

an automotive engine including a cooling jacket therefor;

refrigerant engine cooling fluid in said circuit means;

condenser means for condensing vaporized refrigerant fluid;

means for delivering condensed refrigerant fluid from said condenser means to and through said engine cooling jacket whereby to cool said engine and vaporize said fluid;

means including an aspirator for conveying vaporized refrigerant fluid from said engine to said condenser;

conditioner means, comprising means for passing air in heat exchange relation with said refrigerant fluid to effect heating and cooling; and means for diverting at least a portion of said refrigerant fluid from said cooling jacket directly to said condenser means in response to a predetermined pressure level in said circuit means whereby to maintain the temperature of said cooling jacket below a predetermined temperature.

2. The system of claim 1, including bypass means for diverting fluid from said delivering means to bypass said engine.

3. The system of claim 2 wherein said bypass means comprises a normally open thermostatic valve, responsive to close upon a predetermined increase in engine temperature.

4. The system of claim 1 wherein said delivering means comprises a pump driven by said engine.

5. The system of claim 1 wherein said circuit means comprises first conduit means for conveying a portion of said refrigerant fluid from said condenser means to said conditioner means and second conduit means for conveying said portion from said conditioner means to said condenser means, whereby to constitute said conditioner means as an evaporator for cooling of said passing air.

6. The system of claim 5 including a thermostatic valve connected to control the flow of said fluid portion in response to refrigerant superheat temperature at the exit of said evaporator.

7. The system of claim 5 including means for heat exchange between said first conduit means and said second conduit means.

8. The system of claim 5 wherein said aspirator is a jet ejector and said circuit means additionally comprises, third conduit means between said engine and said jet ejector and fourth conduit means between said jet ejector and said condenser means, said jet ejector being connected to said second conduit means whereby to draw said fluid portion through said second conduit means.

9. The system of claim 8 wherein said delivering means comprises a pump and a fifth conduit between said pump and said engine and including means for heat exchange between said fourth conduit means and said fifth conduit means.

10. The system of claim 1 wherein said circuit means comprises means for conveying refrigerant fluid from said engine to said conditioner means and from said conditioner means to said condenser means to constitute said conditioner means as a condenser means for heating of said passing air.

11. The system of claim 5 wherein said circuit means additionally comprises heat mode circuit means for conveying refrigerant fluid from said engine to said conditioner means and from said conditioner means to said condenser means to constitute said conditioner means as a condenser for heating of said passing air, and including valve means for diverting flow of fluid from said engine into said heat mode conduit means and for preventing said flow as desired.

12. The system of claim 11 including means responsive to air temperature at the exit of said conditioner for modulating said diverting valve means for selective heating and cooling as appropriate.

13. The system of claim 1 wherein said means for diverting a portion of said refrigerant fluid comprises a pressure relief valve.

14. The system of claim 1 wherein said cooling and vaporizing means further comprises a jacketed exhaust manifold for said engine, and further including a thermostatic valve connected to divert condensed refrigerant fluid from a point upstream of said engine to said jacketed exhaust manifold.

* * * * *